United States Patent Office 3,362,992
Patented Jan. 9, 1968

3,362,992
NOVEL CYCLOALKENECARBOXANILIDES
Herbert Schwartz, Smaragdplein 186,
Utrecht, Netherlands
No Drawing. Filed May 27, 1965, Ser. No. 459,418
15 Claims. (Cl. 260—557)

ABSTRACT OF THE DISCLOSURE

Novel cycloalkenecarboxanilides of the formula

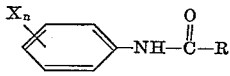
I wherein R is a cycloalkene radical having 3 to 8 carbon atoms and X is at least one member selected from the group consisting of halogen and lower alkyl, lower alkoxy and halogenated lower alkyl of 1 to 7 carbon atoms and $n$ is an integer from 0 to 3. The invention also relates to novel post-emergence herbicidal compositions and to a novel method of controlling weeds.

---

It is an object of the invention to provide novel cycloalkenecarboxanilides of Formula I.

It is another object of the invention to provide novel post-emergence herbicidal compositions.

It is a further object of the invention to provide a novel method of killing weeds.

These and other objects and advantages of the invention will become obvious from the following detailed description.

The novel cycloalkenecarboxanilides of the invention have the formula

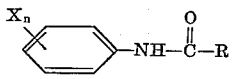
I wherein R is a cycloalkene radical having 3 to 8 carbon atoms and X is at least one member selected from the group consisting of halogen and lower alkyl, lower alkoxy and halogenated lower alkyl of 1 to 7 carbon atoms and $n$ is an integer from 0 to 3. The halogen substituent can be fluorine, chlorine, bromine or iodine, preferably chlorine or bromine. The compositions preferably also contain a surfactant or emulsifier.

Th cycloalkenecarboxanilides of Formula I are excellent post-emergence herbicides and may be used in the form of dusting preparations, solutions, emulsions or dispersions.

In order to prepare a solution suitable for direct spraying, there may be used, for example, a mineral oil fraction of high or medium boiling range, such as diesel oil or kerosene, or coal tar oils, or vegetable or animal oils and also hydrocarbons such as alkylated naphthalenes, or tetrahydronaphthalene, if desired, with the use of xylene mixtures, cyclohexanols, ketones, or chlorinated hydrocarbons, such as tetrachlorethane, trichlorethylene or tri- or tetrachlorobenzenes.

Aqueous preparation suitable for application can be prepared by the addition of water to emulsion concentrates, pastes or wettable powders. As emulsifying or dispersing agents there may be used non-ionic products, for example, condensation products of ethyleneoxide with aliphatic alcohols, amines or carboxylic acids containing a hydrocarbon radical having about 10 to 30 carbon atoms, such as a condensation product of octadecyl alcohol with 25 to 30 molecular proportions of ethylene oxide, or of soya bean fatty acid with 30 molecular proportions of ethylene oxide or of commercial oleylamine with 15 molecular proportions of ethylene oxide or of dodecylmercaptan with 12 molecular proportions of ethylene oxide. Among anion active emulsifying agents there may be mentioned the sodium salt of dodecyl alcohol sulfuric acid ester, the sodium salt of dodecylbenzene sulfonic acid, the potassium or triethanolamine salt of oleic acid or abietic acid or of a mixture of these acids, or the sodium salt of petroleum-sulfonic acid. As cation-active dispersing agents there may be used quaternary ammonium compounds, such as cetyl-pyridinium bromide or di-(hydroxyethyl)-benzyl-dodecyl-ammonium chloride.

For making dusting or scattering preparations there may be used as solid carriers talcum, kaolin bentonite, calcium carbonate or calcium phosphate or carbon, cork meal or wood meal or other materials of vegetable origin. The various preparations can be rendered more suitable for the various ways in which they are to be used by the known addition of substances which improve the dispersing, adhesiveness, resistance to rain or penetration capacity of the compositions. As such substances there may be mentioned fatty acids, resins, glue casein or, for example, alginates or the like.

The cycloalkenecarboxanilide compositions can also contain herbicidal oxidizing ions to obtain synergistic herbicidal compositions. Examples of suitable oxidizing ions are dipyridylium salts such as 1,1'-ethylene-2,2'-dipyridylium dibromide (Diquat), 1,1'-dimethyl-4,4'-dipyridylium di(methylsulfate) (Paraquat), etc.; alkali metal and alkaline earth metal nitrate salts such as sodium nitrate, calcium nitrate, etc.; herbicidal arsenical compounds such as monoalkanearsonic acids and lower dialkanearsinic acids such as methanearsonic acid, propanearsonic acid, dibutane-arsinic acid, dipropanearsinic acid, cacodylic acid (hydroxy-dimethylarsine oxide), etc., and their alkali metal, alkaline earth metal and amine salts such as monosodium methanearsonate (MSMA), disodium methanearsonate (DSMA), calcium hydrogen methanearsonate, and amine salts of the said arsonic acid where the amine is ethanolamine, di-ethanolamine, triethanolamine, isopropylamine, triisopropanolamine, mixtures of alkylamines having 8 to 14 carbon atoms, etc.

The method of the invention for killing weeds comprises contacting the weeds with a toxic amount of at least one cycloalkenecarboxnilide of the formula

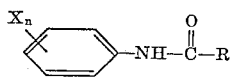
I wherein R is a cycloalkene radical having 3 to 8 carbon atoms and X is at least one member selected from the group consisting of halogen and lower alkyl, lower alkoxy and halogenated lower alkyl of 1 to 7 carbon atoms and $n$ is an integer from 0 to 3.

The compositions, when applied to fields as aqueous solutions suitable for direct spraying, may be applied by the broadcast method or row or band method at a dosage level of about 0.5 to 10 pounds per acre or higher. The dosage level for the row method is usually about one-quarter of the dosage level of the broadcast method.

In the following examples there are described several preferred embodiments to illustrate the invention. However, it should be understood that the invention is not intended to be limited to the specific embodiments.

EXAMPLE I

The cycloalkenecarboxanilides reported in Table I were prepared by reacting the cycloalkenecarboxylic acid halide with the corresponding aniline compound.

TABLE I

| Cycloalkenecarboxanilide | Melting Point, °C | Percent Nitrogen | |
|---|---|---|---|
| | | Calculated | Found |
| 3'-chloro-1-cyclopentenecarboxanilide | 123–124 | 6.32 | 6.43 |
| 3'-bromo-1-cyclopentenecarboxanilide | 121–123 | 5.27 | 5.39 |
| 4'-chloro-1-cyclopentenecarboxanilide | 159–161 | 6.32 | 6.50 |
| 3',4'-dichloro-1-cyclopentenecarboxanilide | 122–123 | 5.47 | 5.66 |
| 3'-chloro-4'-methyl-1-cyclopentenecarboxanilide | 114–115 | 5.95 | 6.15 |
| 3'-chloro-1-cyclohexenecarboxanilide | 139–140 | 5.95 | 6.15 |
| 3',4'-dichloro-1-cyclohexenecarboxanilide | 151–152 | 5.19 | 5.22 |
| 3'-chloro-4'-methyl-1-cyclohexenecarboxanilide | 139–140 | 5.61 | 5.82 |
| 3'-chloro-3-cyclohexenecarboxanilide | 88–89 | 5.95 | 6.01 |
| 3',4'-dichloro-3-cyclohexenecarboxanilide | 137–138 | 5.19 | 5.46 |
| 3'-chloro-4'-methyl-3-cyclohexenecarboxanilide | 125–126 | 5.61 | 5.92 |
| 3'-trifluoromethyl-1-cyclopentenecarboxanilide | 106–108 | 5.49 | 5.60 |
| 3'-trifluoromethyl-1-cyclohexenecarboxanilide | 118–120 | 5.20 | 5.32 |
| 3'-trifluoromethyl-3-cyclohexenecarboxanilide | 84–86 | 5.20 | 5.37 |
| 5'-chloro-2'-methoxy-1-cyclopentenecarboxanilide | 109–111 | 5.57 | 5.65 |
| 5'-chloro-2'-methoxy-1-cyclohexenecarboxanilide | 75–77 | 5.28 | 5.31 |
| 5'-chloro-2'-methoxy-3-cyclohexenecarboxanilide | 81–83 | 5.28 | 5.29 |

EXAMPLE II

*General post-emergence herbicidal activity*

To demonstrate the general herbicidal activity of the cycloalkenecarboxanilides of the invention, the said compounds were applied to seven different type of plants according to the following procedure:

The compounds were prepared as 10% emulsion concentrates in two specific types of solvent systems as follows.

Formula F:
| | Percent by wt. |
|---|---|
| Compound | 10 |
| Triton X-161 | 10 |
| Solvent F | 80 |

Formula 50M:
| | |
|---|---|
| Compound | 10 |
| Triton X-161 | 10 |
| Solvent 50M | 80 |

Triton X-161 is a blend of anionic and non-ionic alkyl aryl polyether alcohols and organic sulfonates. Solvent F is a 50:50 by volume mixture of diethylene glycol monobutyl ether acetate and Velsicol AR50 (methylated naphthalenes). Solvent 50M is a 20:80 by volume mixture of ethyl acetate and Velsicol AR50. Before application the concentrates were diluted to a concentration of 2000 p.p.m. of the compound being tested.

The seven crops to be tested had been planted in flats 10 to 12 days before the tests and were well established seedling. The plants were sprayed on an endless belt spray system operating at a belt speed of 0.44 mile per hour which applied to each flat containing the seven crops the spray solution at an equivalent of 25 gallons per acre. The plants were then kept under constant daily surveillance for a period of 7 to 14 days. The final phytotoxicity data was recorded at the end of 14 days and the plants were scored for phytotoxicity ratings on a scale from 0 (no injury to plants) to 10 (all the plants were killed). The results of the tests are summarized in Table II.

TABLE II

| Cycloalkenecarboxanilide | Solvent | Phytotoxicity Rating | | | | | | |
|---|---|---|---|---|---|---|---|---|
| | | Beets | Tomatoes | Radish | Johnson Grass | Oats | Wheat | Cucumber |
| 3'-chloro-1-cyclopentenecarboxanilide | F | 9 | 6 | 6 | 7 | 3 | 2 | 4 |
| | 50M | | | | | | | |
| 3'-bromo-1-cyclopentenecarboxanilide | F | 5i | 8i | 7i | 9 | 6 | 2 | 3 |
| | 50M | 3i | 7i | 2 | 1 | 3TB | 0 | 1 |
| 4'-chloro-1-cyclopentenecarboxanilide | F | 5i | 4iM | 5i | 8 | 1 | 6 | 1 |
| | 50M | 5iM | 7iM | 7iM | 2 | 0 | 0 | 2 |
| 3',4'-dichloro-1-cyclopentenecarboxanilide | F | 10 | 10 | 10 | 8 | 6 | 3 | 10 |
| | 50M | 9 | 9.5 | 9.5 | 2 | 4 | 7 | 7 |
| 3'-chloro-4'-methyl-1-cyclopentenecarboxanilide | F | 10 | 10 | 7 | 9 | 2 | 0 | 1 |
| | 50M | 5 | 9 | 9 | 0 | 0 | 0 | 5 |
| 3',4'-dichloro-1-cyclohexenecarboxanilide | F | 10 | 6 | 7 | 3 | 1 | 5 | 6 |
| | 50M | 8 | 8 | 8 | 2 | 1 | 6 | 5 |
| 3'-chloro-4'-methyl-1-cyclohexenecarboxanilide | F | 9 | 9 | 6 | 8 | 2 | 0 | 6 |
| | 50M | 6 | 7 | 2 | 2 | 0 | 0 | 4 |
| 3'-chloro-3-cyclohexenecarboxanilide | F | 10 | 9 | 10 | 3 | 1 | 3 | 5 |
| | 50M | 10 | 10 | 10 | 2 | 4 | 2 | 9 |
| 3',4'-dichloro-3-cyclohexenecarboxanilide | F | 10 | 2 | 9 | 3 | 4 | 1 | 6 |
| | 60M | 10 | 10 | 9 | 4 | 4 | 3 | 10 |
| 3'-chloro-4'-methyl-3-cyclohexenecarboxanilide | F | 9 | 7 | 9 | 6 | 2 | 1 | 5 |
| | 50M | 9 | 9 | 10 | 2 | 0 | 0 | 8 |
| Control | | 0 | 0 | 0 | 0 | 0 | 0 | 0 | i—Inhibited.   TB—Tip burn.   M—Morphogenic change.

EXAMPLE III

*Selective post-emergence herbicidal activity*

The cycloaklenecarboxanilides were all tested as 10% emulsion concentrates using 0.5 gm. of the said anilides and 4.5 ml. of a solvent consisting of 45% AR50, 45% Butyl Carbitol Acetate and 10% Triton X-161 which was diluted with 100 ml. of water. The said solution was used for spraying the plants at a dosage of 0.8 pound of the cycloalkenecarboxanilide per acre.

The flats sprayed contained plants sown in rows alternating cotton plants with Johnson grass and at the time of spraying, the cotton was in the seedling state and the Johnson grass was about ½ to 1 inch in height or the seedling stage. Pots of cotton were also sprayed in which the cotton was in the 4-leaf stage with 2 well developed true leaves and 2 cotyledonary leaves. Pots of red kidney beans having 2 well-developed true leaves and pots of small, medium and large Johnson grass and pots of tomatoes were also sprayed. The data is presented in Table III using the phytotoxicity ratio of 0 to 10.

The table shows the clear-cut herbicidal selectivity of said compounds on Johnson grass with a minimum of injury to cotton.

Various modifications of the compositions of the invention may be made without departing from the spirit or scope thereof and it is to be understood that the invention is to be limited only as defined in the appended claims.

I claim:

1. A cycloalkenecarboxanilide of the formula

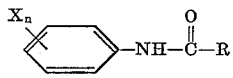

wherein R is a cycloalkene radical having 5 to 6 carbon atoms and X is at least one member selected from the group consisting of halogen and lower alkyl, lower alkoxy and halogenated lower alkyl of 1 to 7 carbon atoms and $n$ is an integer from 1 to 2.

2. 3′-chloro-1-cyclopentenecarboxanilide.
3. 3′-bromo-1-cyclopentenecarboxanilide.
4. 3′,4′-dichloro-1-cyclopentenecarboxanilide.
5. 4′-chloro-1-cyclopentenecarboxanilide.
6. 3′-chloro-4′-methyl-1-cyclopentenecarboxanilide.
7. 3′-chloro-1-cyclohexenecarboxanilide.

TABLE III

| Cycloalkenecarboxanilides | Phytotoxicity Rating | | | | | | | |
|---|---|---|---|---|---|---|---|---|
| | Flats | | Pots | | | | | |
| | Johnson Grass | Cotton | Cotton | Beans | Tomatoes | Johnson Grass | | |
| | | | | | | Small | Medium | Large |
| 3′-chloro-1-cyclopentenecarboxanilide | 10 | 4 | 0 | 2 | 0 | 4 | 2 | 9 |
| 3′-bromo-1-cyclopentenecarboxanilide | 9.5 | 3 | 0 | 4 | 2 | ---------- | 10 | 9 |
| 4′-chloro-1-cyclopentenecarboxanilide | 8 | 2 | 0 | 3 | 1 | ---------- | 10 | 9 |
| 3′,4′-dichloro-1-cyclopentenecarboxanilide | 8 | 2 | 1.5 | 4 | 4 | 8 | 6 | 7 |
| 3′-chloro-4′-methyl-1-cyclopentenecarboxanilide | 8 | 3 | 1 | 5 | 3 | ---------- | 10 | 5 |
| 3′-chloro-1-cyclohexenecarboxanilide | 7 | 3 | 1 | 2 | 4 | 8 | 7 | 5 |
| 3′-chloro-4′-methyl-1-cyclohexenecarboxanilide | 8 | 2 | 1 | 1 | 3 | 10 | 6 | 8 |
| 3′-chloro-3-cyclohexenecarboxanilide | 4 | 1 | 2 | 3 | 4 | 6 | 7 | 8 |
| 3′,4′-dichloro-3-cyclohexenecarboxanilide | 3 | 4 | 2 | 4 | 7 | 1 | 4 | 6 |
| Control | 0 | 0 | 0 | 0 | 0 | 0 | 0 | 0 |

EXAMPLE IV

*Selective post-emergence herbicidal activity*

Using the procedure of Example III, pots of seedling cotton, cotton in the 4-leaf stage, seedling Johnson grass and Johnson grass about 5 cm. high were sprayed with 3′-trifluoromethylcycloalkenes and the phytotoxicity ratings were made. The results are summarized in Table IV.

8. 3′,4′-dichloro-1-cyclohexenecarboxanilide.
9. 3′-chloro-4-methyl-1-cyclohexenecarboxanilide.
10. 3′-trifluoromethyl-1-cyclopentenecarboxanilide.
11. 3′-trifluoromethyl-1-cyclohexenecarboxanilide.
12. 3′-trifluoromethyl-3-cyclohexenecarboxanilide.
13. 3′-chloro-3-cyclohexenecarboxanilide.
14. 3′,4′-dichloro-3-cyclohexenecarboxanilide.
15. 3′-chloro-4′-methyl-3-cyclohexenecarboxanilide.

TABLE IV

| Compound | Phytotoxicity Rating | | | |
|---|---|---|---|---|
| | Seedling Cotton | 4-Leaf Cotton | Seedling J. Grass | 5 cm. J. Grass |
| 3′-trifluoromethyl-1-cyclopentenecarboxanilide | 2 | 1 | 9 | 7 |
| 3′-trifluoromethyl-1-cyclohexenecarboxanilide | 3 | 1.5 | 8 | 10 |
| 3′-trifluoromethyl-3-cyclohexenecarboxanilide | 1 | 1 | 7 | 9 |

References Cited

Hawkins et al.: J. Chem. Soc. (1955), pp. 1462–8.

Tiffeneau et al.: Compt. Rend., vol. 212, pp. 581–5 (1941).

JOHN D. RANDOLPH, *Primary Examiner.*

WALTER A. MODANCE, *Examiner.*

H. I. MOATZ, *Assistant Examiner.*